US012700681B2

(12) United States Patent
Feria et al.

(10) Patent No.: US 12,700,681 B2
(45) Date of Patent: Aug. 4, 2026

(54) ACCELERATED SATELLITE ACQUISITION SCHEME

(71) Applicant: The Boeing Company, Chicago, IL (US)

(72) Inventors: Ying J. Feria, Manhattan Beach, CA (US); David Whelan, Newport Coast, CA (US); Parthasarathy Ramanujam, Redondo Beach, CA (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 18/168,110

(22) Filed: Feb. 13, 2023

(65) Prior Publication Data

US 2023/0198166 A1 Jun. 22, 2023

Related U.S. Application Data

(63) Continuation of application No. 15/375,490, filed on Dec. 12, 2016, now abandoned.

(51) Int. Cl.
*H01Q 21/22* (2006.01)
*H01Q 3/26* (2006.01)
*H01Q 21/20* (2006.01)

(52) U.S. Cl.
CPC ............... *H01Q 21/22* (2013.01); *H01Q 3/26* (2013.01); *H01Q 21/205* (2013.01)

(58) Field of Classification Search
CPC ...... H01Q 21/205; H01Q 21/22; H01Q 25/00; H01Q 25/04
See application file for complete search history.

(56) References Cited

U.S. PATENT DOCUMENTS 5,151,706 A 9/1992 Roederer et al.
6,034,634 A * 3/2000 Karlsson ................. H01Q 3/26 342/359

(Continued)

FOREIGN PATENT DOCUMENTS

CN 103364805 A 10/2013
CN 205752544 U 11/2016

(Continued)

OTHER PUBLICATIONS

Pilot. (1999). Focal Dictionary of Telecommunications, Focal Press. London, UK: Routledge. Retrieved from http://search.credoreference.com/content/entry/bhfidt/pilot/0 (Year: 1999).*

(Continued)

*Primary Examiner* — Resha Desai
*Assistant Examiner* — Fred H Mull
(74) *Attorney, Agent, or Firm* — Harrity & Harrity, LLP

(57) ABSTRACT

A user terminal includes a reconfigurable phased array antenna having a plurality of antenna elements. The user terminal is operable for: broadening a field of regard of the reconfigurable phased array antenna; receiving signals from a plurality of satellites within the field of regard using the reconfigurable phased array antenna; determining one or more attributes of the received signals for each of the satellites; and selecting one of the plurality of satellites for communication based on the attributes of the received signals. After the satellite has been selected, the user terminal is configured for: switching to a directional mode for the reconfigurable phased array antenna; establishing the communication with the selected satellite using the reconfigurable phased array antenna; and tracking the selected satellite. Ephemeris data broadcast by the satellites is used by the user terminal to track the satellites and to perform handovers between satellites.

20 Claims, 7 Drawing Sheets

(56) References Cited

U.S. PATENT DOCUMENTS

| | | | |
|---|---|---|---|
| 6,111,542 A | 8/2000 | Day et al. | |
| 6,961,025 B1 | 11/2005 | Chethik et al. | |
| 2003/0128159 A1 | 7/2003 | Chapelle et al. | |
| 2004/0014502 A1 | 1/2004 | Shurvinton et al. | |
| 2004/0038713 A1 | 2/2004 | Okawa et al. | |
| 2008/0026797 A1 | 1/2008 | Nanda et al. | |
| 2009/0232023 A1 | 9/2009 | Soffer et al. | |
| 2009/0284411 A1 | 11/2009 | Tessier | |
| 2016/0093950 A1 | 3/2016 | Cummings et al. | |
| 2017/0126296 A1 | 5/2017 | Molev et al. | |
| 2018/0006710 A1* | 1/2018 | Buer .................. | H04B 7/18517 |
| 2018/0164441 A1 | 6/2018 | Feria et al. | |

FOREIGN PATENT DOCUMENTS

| | | | | |
|---|---|---|---|---|
| EP | 1802008 A2 | 6/2007 | | |
| EP | 1802008 A3 | 10/2009 | | |
| EP | 3010086 A1 | 4/2016 | | |
| EP | 3010086 B1 | 11/2017 | | |
| JP | 2002232335 A | 8/2002 | | |
| JP | 2003198441 A | 7/2003 | | |
| JP | 2008502226 A | 1/2008 | | |
| RU | 2491685 C2 | 8/2013 | | |
| WO | WO-2011019051 A1 * | 2/2011 | ............ | H01Q 3/446 |

OTHER PUBLICATIONS

D.E. Lawrence, Low Probability of Intercept Antenna Array Beamforming, IEEE Transactions on Antennas and Propagation, vol. 58(9), p. 2858-2856 (Year: 2010).*

Phased Array Antennas, Microwaves 101.com http://www.microwaves101.com:80/encyclopedias/phased-array-antennas, 6 pages, Sep. 5, 2016 (Year: 2016).*

Nelson, D. (Ed.). (2008). Singleton (unit set). The Penguin Dictionary of Mathematics (4th ed.). https://search.credoreference.com/articles/Qm9va0FydGljbGU6MTlwNTMyNQ==?aid=279753 (Year: 2008).*

Canadian Office Action dated Aug. 4, 2021 for Canadian Patent Application No. 2,982,038.

Canadian Office Action dated Oct. 20, 2020 for Canadian Patent Application No. 2,982,038.

Chinese 2nd Notification of Office Action (with English translation) dated Oct. 9, 2021 for Chinese Patent Application No. 201711283362.6.

Chinese Office Action dated Apr. 20, 2021 for Chinese Application No. 201711283362.6.

Chinese Office Action dated Feb. 11, 2022 for CN Application No. 201711283362.6.

European Examination Report (Office Action) dated Feb. 7, 2022 for European Patent Application No. 17197858.8.

European Examination Report dated Dec. 1, 2020 for European Patent Application No. 17197858.8.

European Examination Report dated Mar. 15, 2019 for European Patent Application No. 17197858.8.

Extended European Search Report dated May 2, 2018 for European Patent Application No. 17197858.8.

IEEE Standards Association, IEEE Standard for Radar Definitions, IEEE Std. 686-2017, Mar. 23, 2017.

Japanese Notice of Reasons for Rejection (with English translation) dated Oct. 5, 2021 for Japanese Patent Application No. 2017-234821.

Kerce, J. Clayton, George C. Brown, and Mark A. Mitchell, "Phase-only transmit beam broadening for improved radar search performance," In Radar Conference, 2007 IEEE, pp. 451-456. IEEE, 2007. http://kerce.net/papers/transmit_beam_broadening_and_search.pdf.

Korean Office Action (with English translation) dated Aug. 31, 2021 for Korean Patent Application No. 10-2017-0140763.

R. Kinsey, "Phased array beam spoiling technique," Antennas and Propagation Society International Symposium, Jul. 1, 13997-Jul. 18, 1997. IEEE., 1997 Digest (vol. 2), pp. 698-701.http://ieeexplore.ieee.org/xpls/abs_all.jsp?arnumber=631557&tag=1.

R. Young, Antenna Pattern Control by Phase-Only Weighting, p. 5/1-5/7.

Richard C. Johnson, Antenna Engineering Handbook, Third Edition, 1993, 1-4.

Russian Office Action (with English translation) dated Oct. 30, 2020 for Russian Patent Application No. 2017136438/07(063533).

Slew 4. (2016). The American Heritage Dictionary of the English Language (6th ed.). Boston, MA: Houghton Mifflin. Retrieved from https://search .credoreference.com/content/entry/hmdictenglang/slew_4/0 (Year: 2016).

Canadian Office Action mailed May 27, 2022 for Canadian Application No. 2982038.

Chinese Office Action dated Jul. 5, 2022 for Chinese Application No. CN 201711283362.6.

Japanese Decision of Rejection dated Jul. 12, 2022 for Japanese Application No. JP 2017-234821.

* cited by examiner

ACCELERATED SATELLITE ACQUISITION SCHEME

CROSS REFERENCE TO RELATED APPLICATIONS

This application is continuation under 35 U.S.C Section 120 of the following co-pending and commonly-assigned application:

U.S. Utility application Ser. No. 15/375,490, filed on Dec. 12, 2016, by Ying J. Feria, David Whelan and Parthasarathy Ramanujam, entitled "ACCELERATED SATELLITE ACQUISITION SCHEME,";

which application is incorporated by reference herein.

BACKGROUND INFORMATION

1. Field

The present invention relates to satellite communications networks, and in particular to an accelerated satellite acquisition scheme for satellite-capable user terminals.

2. Description of the Related Art

In recent years, there has been an increased demand for wireless communications services. Various capabilities and services are being integrated into mobile devices, including the use of satellites operating in low Earth orbit (LEO) and medium Earth orbit (MEO), as well as geostationary or geosynchronous Earth orbit (GEO).

LEO is the simplest and cheapest for satellite placement, and it provides high bandwidth and low latency for communications services. Similarly, the most common use for satellites in MEO is for communications services, although navigation and geodetic/space environment science applications use MEO as well.

A problem exists in that satellites in both LEO and MEO are not visible from any given point on the Earth at all times, unlike GEO satellites. Because these LEO and MEO orbits are not geostationary, a network or constellation of satellites is required to provide continuous communications services coverage.

For both LEO and MEO satellites, current satellite signal acquisition techniques are based on using an omni-directional antenna in a user terminal, which can see most of the satellites in a field of regard (FoR) or field of view (FoV). The field of regard is the total area that can be captured by an antenna, while the field of view is an angular cone perceivable by the antenna at a particular time instant. The field of regard is typically much larger than the field of view, although the field of regard and field of view coincide for a stationary antenna.

When the user terminal is turned on, it needs to acquire the strongest satellite signal among the many signals in the field of regard or field of view.

However, with the advent of satellite broadband communications services, the antenna in the user terminal needs to be directional for higher gain. Specifically, this feature benefits the normal communication channel speed, but it is not desired during acquisition of the satellite signal.

What is needed, then, is an omni-directional antenna for use during signal acquisition, and a directional antenna for use during normal communications. The present invention satisfies this need.

SUMMARY

To overcome the limitations in the prior art described above, and to overcome other limitations that will become apparent upon reading and understanding the present specification, the present invention discloses a method and apparatus for establishing communication with a satellite by providing a user terminal including a reconfigurable phased array antenna having a plurality of antenna elements. The user terminal is operable for: broadening a field of regard of the reconfigurable phased array antenna; receiving signals from a plurality of satellites within the field of regard using the reconfigurable phased array antenna; determining one or more attributes of the received signals for each of the satellites; and selecting one of the plurality of satellites for communication based on the attributes of the received signals.

Prior to selecting the field of regard, the reconfigurable phased array antenna is stationary. Alternatively, the reconfigurable phased array antenna is slewed to establish an initial pointing vector comprised of an azimuth and elevation prior to selecting the field of regard, but the reconfigurable phased array antenna is not slewed once the field of regard is selected.

The field of regard is broadened by using a lesser number than a total number of the plurality of antenna elements of the reconfigurable phased array antenna. This includes selecting one antenna element from the plurality of antenna elements of the reconfigurable phased array antenna, or selecting a sub-array of two or more antenna elements from the plurality of antenna elements of the reconfigurable phased array antenna.

The field of regard is also broadened by using a spoiled beam by changing at least one of a phase and amplitude for one or more of the plurality of antenna elements of the reconfigurable phased array antenna to spread a beam width. The spoiled beam is generated by introducing a phase difference that alters a coherence of the received signals at the reconfigurable phased array antenna.

The attributes used for selecting the satellite comprise signal strength, signal quality, or proximity to other signals.

After the satellite has been selected, the user terminal is operable for: switching to a directional mode for the reconfigurable phased array antenna; establishing the communication with the selected satellite using the reconfigurable phased array antenna; and tracking the selected satellite.

When tracking the selected satellite, an initial pointing vector comprised of an azimuth and elevation and an initial tracking vector comprised of a flight path are determined for the reconfigurable phased array antenna based on ephemeris data for the satellites relative to a current terrestrial or airborne location of the user terminal.

DRAWINGS

Referring now to the drawings in which like reference numbers represent corresponding parts throughout:

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

System Description

Figure 1:
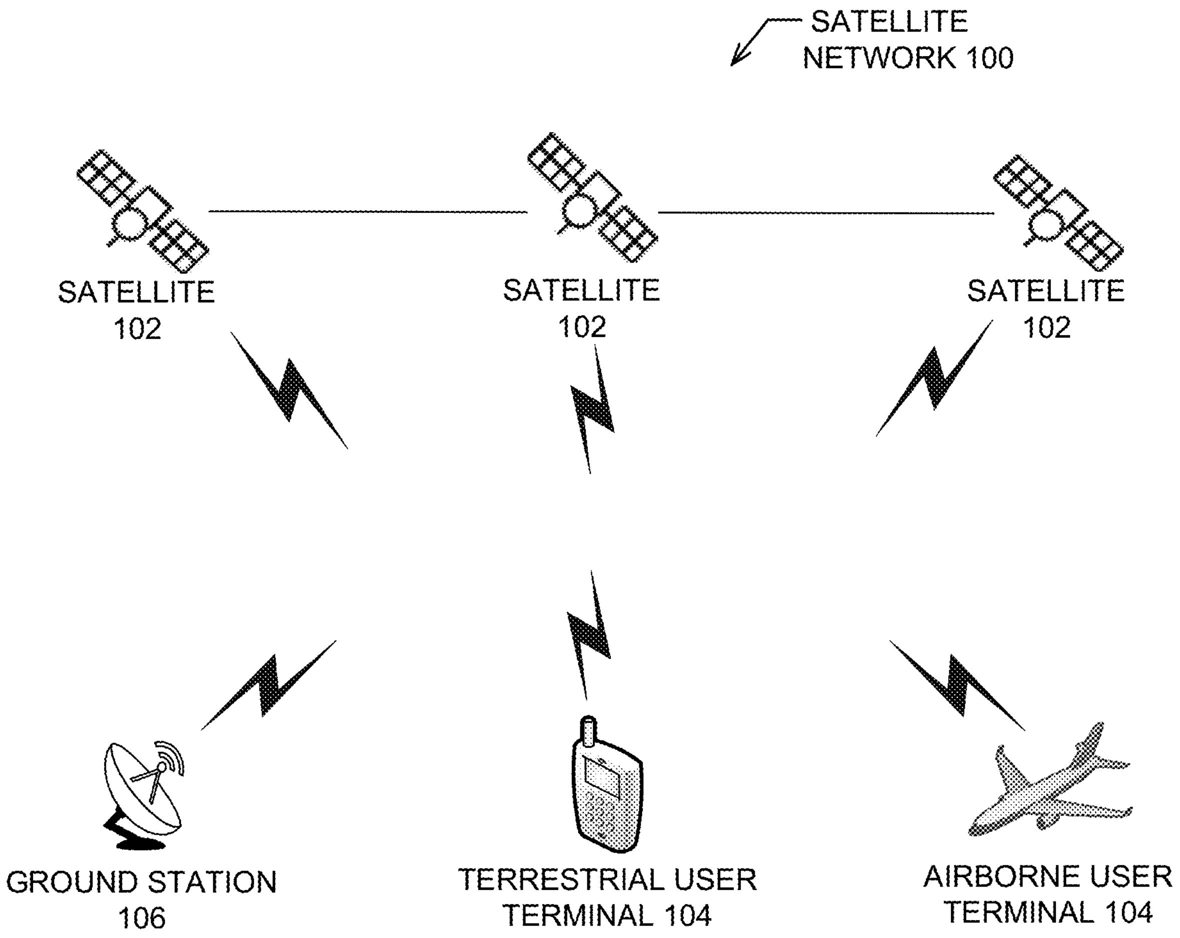
FIG. 1 is a diagram showing an exemplary communications system, according to one embodiment.

FIG. 1 is a diagram showing an exemplary communications system, according to one embodiment. The communications system comprises a satellite network 100 that includes one or more satellites 102, and one or more satellite-capable user terminals 104 are provided, which are also labeled as a terrestrial user terminal 104 and an airborne user terminal 104 in FIG. 1, for communicating with the satellites 102.

Also in the example of FIG. 1, the satellite network 100 includes a ground station 106 for transmitting and receiving data to and from the satellites 102. The satellite network 100 may also interface to one or more other satellite, terrestrial and/or airborne networks (not shown), for example, a cellular or personal communications systems (PCS) network, wireless local area networks (WLANs), personal area networks (PANs), or other networks. The user terminals 104 may also operate with the other satellite, terrestrial and/or airborne networks.

There are a number of benefits to using a satellite network 100. One benefit is the ubiquitous coverage of the satellite network 100 as an alternative network option to the terrestrial networks. Another benefit of the satellite network 100 is surge capacity to overcome congestion in the terrestrial networks. A satellite network 100 also transcends outages in the terrestrial networks.

User Terminal

Figure 2:
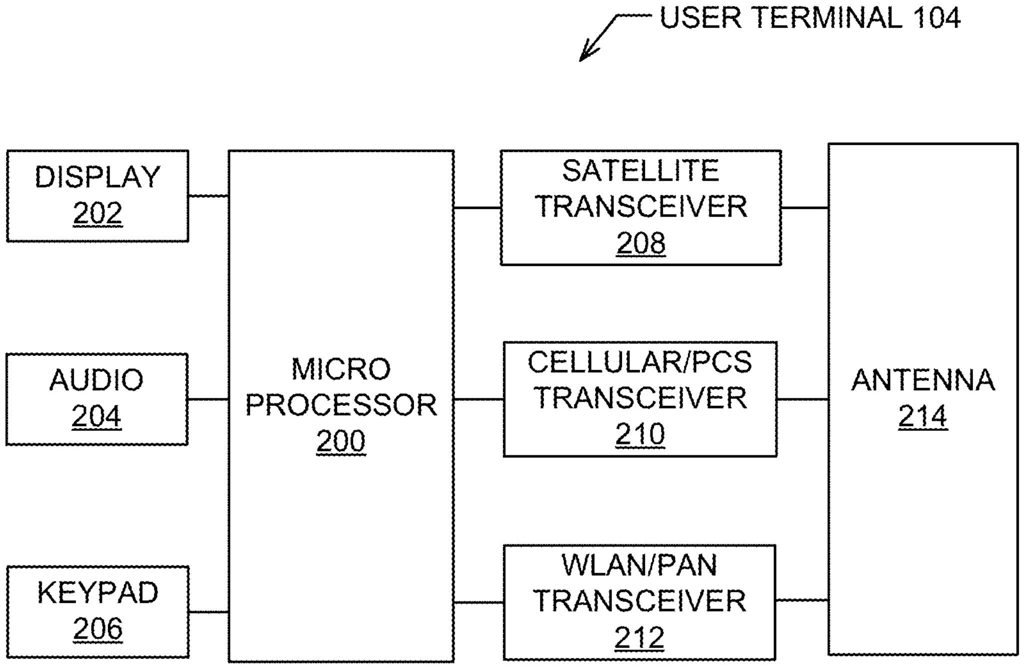
FIG. 2 illustrates the components of the satellite-capable mobile user terminal, according to one embodiment.

FIG. 2 illustrates the components of an exemplary user terminal 104, according to one embodiment. The user terminal 104 includes a microprocessor 200 for controlling the terminal's 104 operations; one or more input/output components coupled to the microprocessor 200, such as display 202, audio 204 and keypad 206, for inputting and outputting data as directed by the microprocessor 200; a plurality of transmit/receive components coupled to the microprocessor 200 for communicating with a plurality of communications networks as directed by the microprocessor 200, wherein the transmit/receive components include a satellite transceiver 208 for communicating with the satellite network 100, a cellular/PCS transceiver 210 for communicating with a cellular/PCS network, a WLAN/PAN transceiver 212 for communicating with other WLAN/PAN elements, as well as transmit/receive components (not shown) for communicating with other networks; and an integrated antenna 214 coupled to the transmit/receive components, such as transceivers 208, 210 and 212, for communicating with the various communications networks.

Phased Array Antenna

Figure 3A:
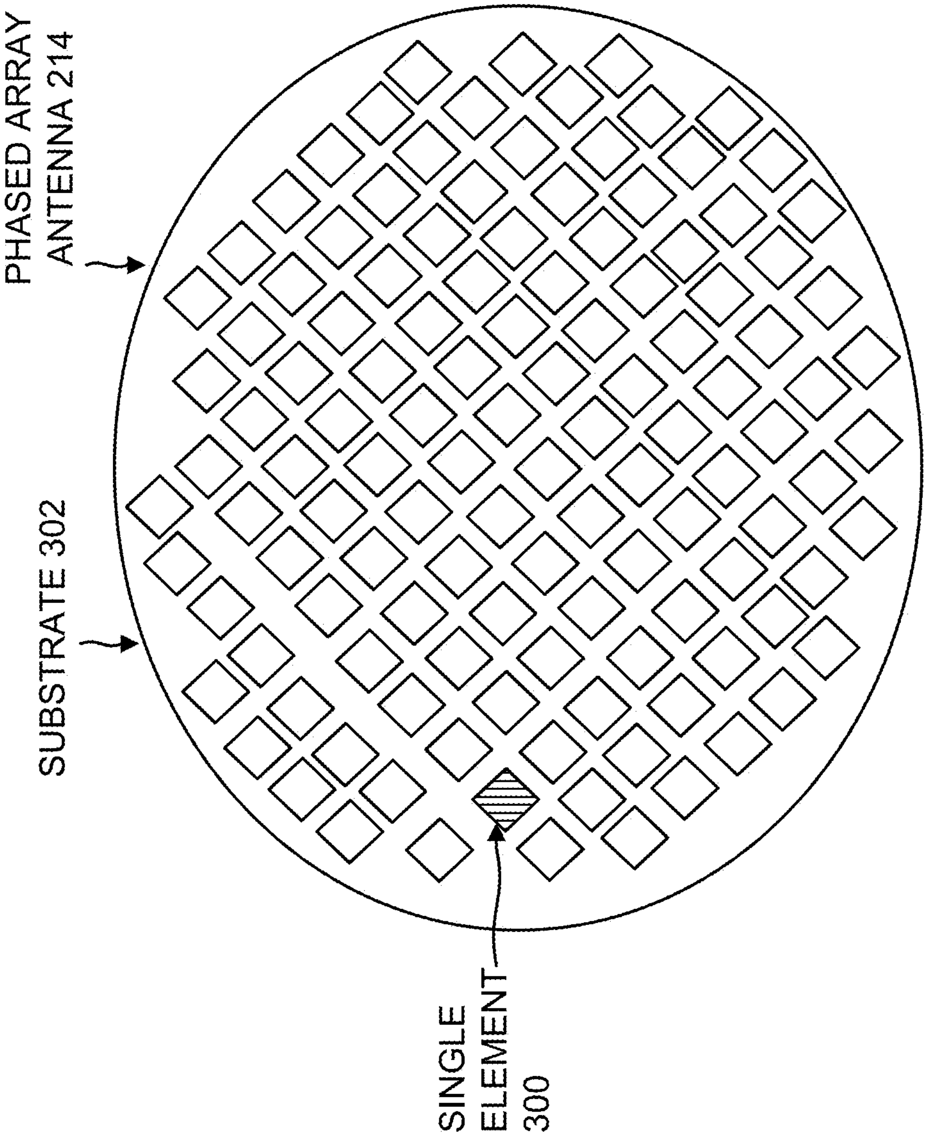
FIGS. 3A and 3B illustrate alternative embodiments for the antenna used by the user terminal, according to one embodiment.
Figure 3B:
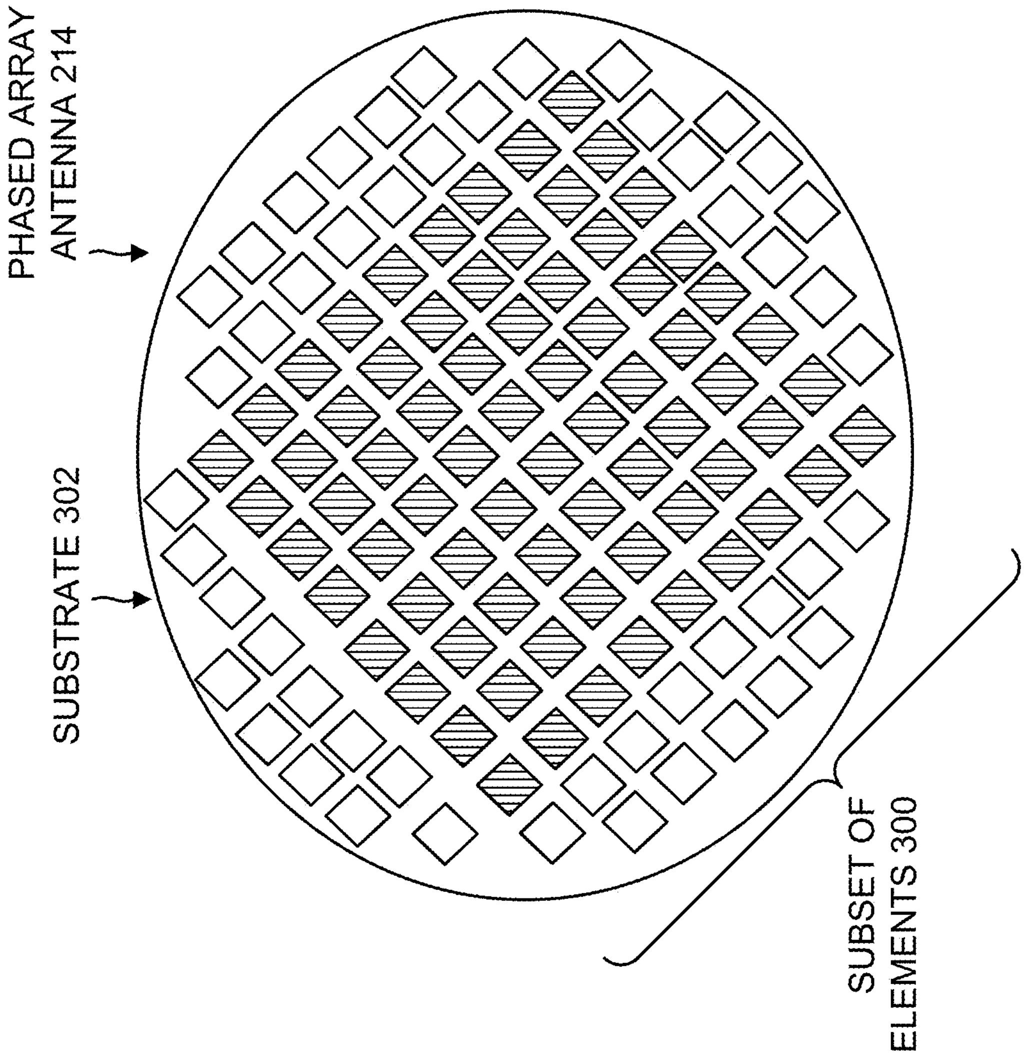

FIGS. 3A and 3B illustrate alternative embodiments for the antenna 214 used by the user terminal 104, according to one embodiment. In both embodiments, the antenna 214 comprises a reconfigurable phased array antenna 214 that is omni-directional for use during signal acquisition and directional for use during normal communication. Specifically, the phased array antenna 214 is configured to be omni-directional to acquire the strongest satellite 102 signal among the signals in the field of regard, but the phased array antenna 214 is configured to be directional to provide the highest gain during normal communication. In this manner, the user terminal 104 optimizes and accelerates the satellite 102 signal acquisition process.

As shown in both FIGS. 3A and 3B, the phased array antenna 214 is comprised of an array of radiating elements 300 formed on a substrate 302. Each element 300 is shown as a square feature, but could comprise a patch, dipole, slot or other type of antenna element 300. The substrate 302 is shown as a circular feature, but could comprise any shape.

The elements 300 are individually selectable by the user terminal 104, such that the phases and/or amplitudes of signals feeding the elements 300 are varied to create a desired radiation pattern for the antenna 214. The resulting beams of the desired radiation pattern are formed and then steered by sequentially shifting the phase and/or amplitude of the signals feeding each element 300 to provide a constructive desired signal and/or destructive interference.

During acquisition of a satellite 102 signal, the phased array antenna 214 is re-configured, either by using only one element 300 to broaden the field of regard, or by using a "spoiled beam" with a subset or all of the elements 300 to broaden the field of regard, as well as to increase a receiving area for an increased signal-to-noise ratio (SNR). FIG. 3A illustrates one embodiment, wherein only one of the elements 300 of the phased array antenna 214 is turned on for receiving, as indicated by the fill pattern, wherein this single element 300 has a much broader beam looking at a broadened field of regard, so it can see as many satellites 102 as possible. FIG. 3B illustrates another embodiment, wherein a spoiled beam is formed using a subset or all of the elements 300, as indicated by the fill patterns, to broaden the field of regard, but with higher antenna 214 directivity to increase the signal-to-noise ratio.

The attributes of the signals received from one or more of the satellites 102 are analyzed by the user terminal 104, and a preferred satellite 102 is then selected by the user terminal 104 based on the attributes of the signals. After the satellite 102 has been selected, the phased array antenna 214 is re-configured to be directional towards the selected satellite 102 to provide a higher gain during normal communication with the selected satellite 102. Specifically, once the strongest satellite signal is acquired, the phased array antenna 214 is reconfigured to its beamforming mode to form a beam that is pointed at the satellite 102.

In one embodiment, ephemeris data broadcast by the satellites 102 is used to slew/point the antenna 214 and its beam at the selected satellite 102, to keep tracking the selected satellite 102 after its signal is acquired. The ephemeris data comprises the location for the satellites 102 in the constellation at a particular point in time, and is broadcast by each of the satellites 102 on a low data rate pilot signal.

The ephemeris data broadcast by the satellites 102 is also used by the user terminal 104 to perform handoffs between satellites 102 in the constellation. Specifically, the user terminal 104 performs a "make before break" seamless satellite-to-satellite handover using the ephemeris data broadcast by the satellites 102 to select a next satellite 102 for use, before it terminates communication with the current satellite 102. Using the ephemeris data broadcast by the satellites 102, the user terminal 104 knows the positions of the satellites 102 in the constellation and acquires the signals from the next satellite 102 either with a wide beam (e.g., an omni-directional or spoiled beam) or another high-gain beam (e.g., a directional beam) pointing at the next satellite 102 for a satellite-to-satellite handover.

Beam Patterns

Figure 4C:
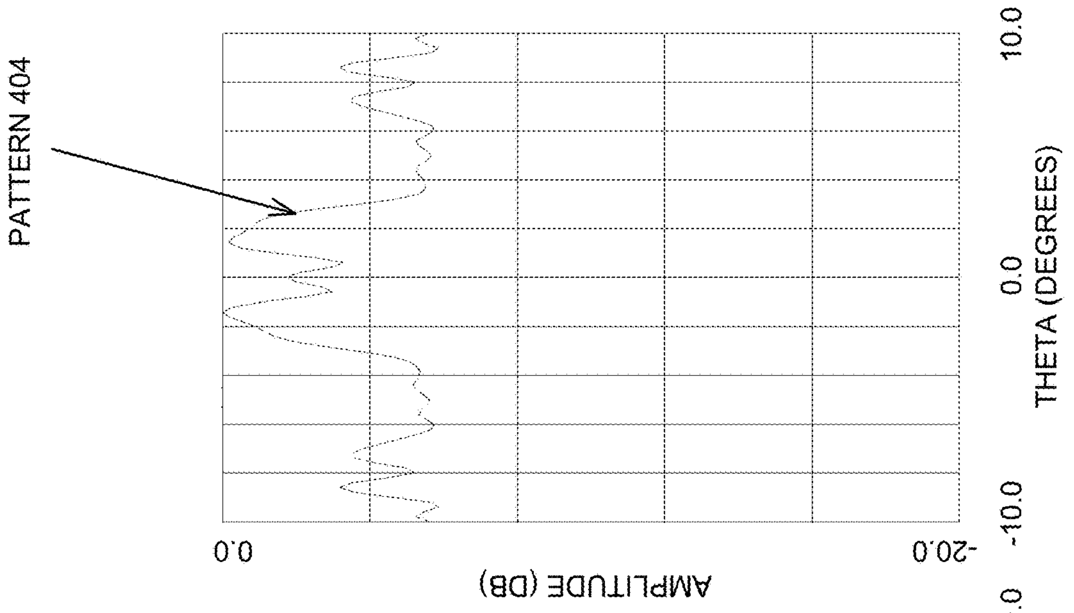
FIGS. 4A, 4B and 4C are graphs of theta (degrees) vs. amplitude (dB), illustrating the difference in beam patterns of the antenna for acquisition mode vs. tracking mode, according to one embodiment.
Figure 4B:
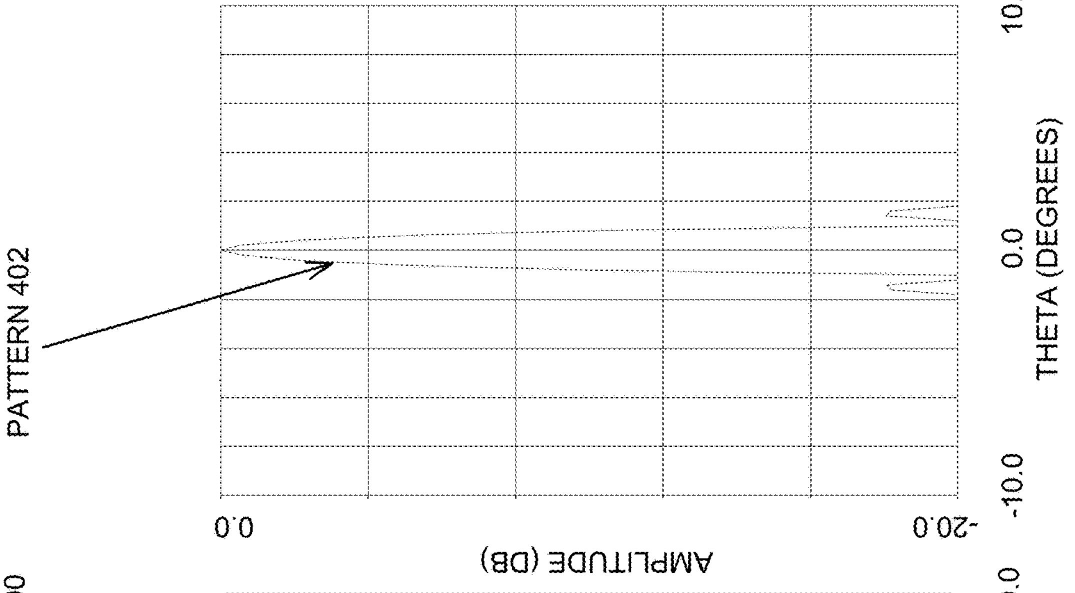
Figure 4A:
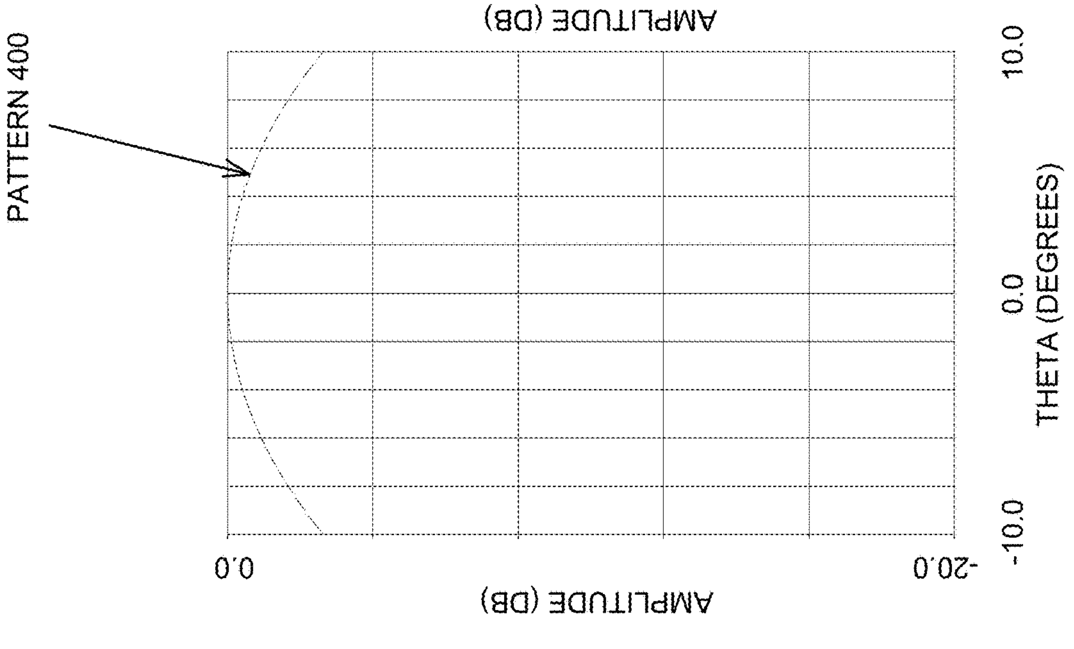

FIGS. 4A, 4B and 4C are graphs of theta (degrees) vs. amplitude (dB), illustrating the difference in beam patterns of the antenna 214 for acquisition mode vs. tracking mode.

FIG. 4A illustrates an array beam pattern for the antenna 214 in an acquisition mode, using one of the elements 300 of the antenna 214 for a wider beamwidth with lower gain that allows the antenna 214 to "see" as many satellite 102 signals as possible in the field of regard. Specifically, FIG. 4A illustrates a plane cut of a one-element 300 beam used for acquisition, with a +/−10 degree beam width (at −3 dB to −5 dB down from the peak).

FIG. 4B illustrates an array beam pattern for the antenna 214 in a tracking mode, using all (or most) of the elements 300 of the antenna 214 for narrow beamwidth and higher gain that allows the antenna 214 to provide greater bandwidth to the selected satellite 102. Specifically, FIG. 4B illustrates a plane cut of an all-element 300 narrow beam for tracking, with a +/−0.5 degree beam width (at −3 dB down from the peak).

FIG. 4C illustrates an array beam pattern for the antenna 214 in an acquisition mode, using a "spoiled beam" for a wider beamwidth with lower gain that allows the antenna 214 to "see" as many satellite 102 signals as possible in the field of regard. Specifically, FIG. 4C illustrates a plane cut of an all element 300 spoiled beam for acquisition, with a +/−3 degree beam width (at −3 dB down from the peak). Note that the spoiled beam shown in FIG. 4C has a higher edge directivity (~18.0 dBi within the beamwidth of +/−10 degrees) than that of the single element beam (~15.9 dBi) shown in FIG. 4A.

Figure 5A:
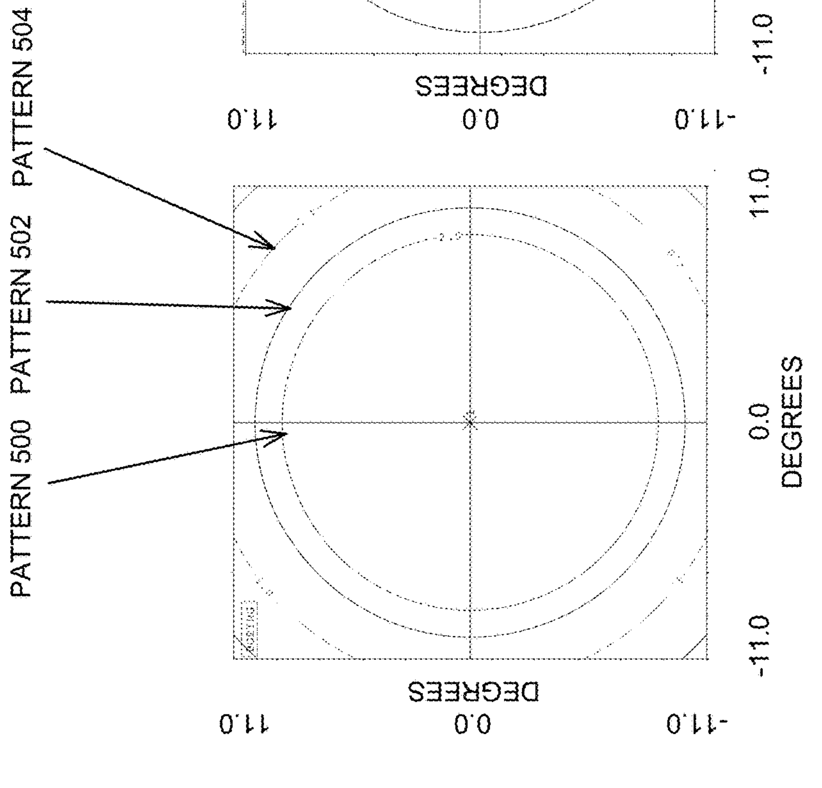
FIGS. 5A, 5B and 5C are diagrams (in degrees), illustrating the difference in beam patterns of the antenna for acquisition mode vs. tracking mode, according to one embodiment.
Figure 5B:
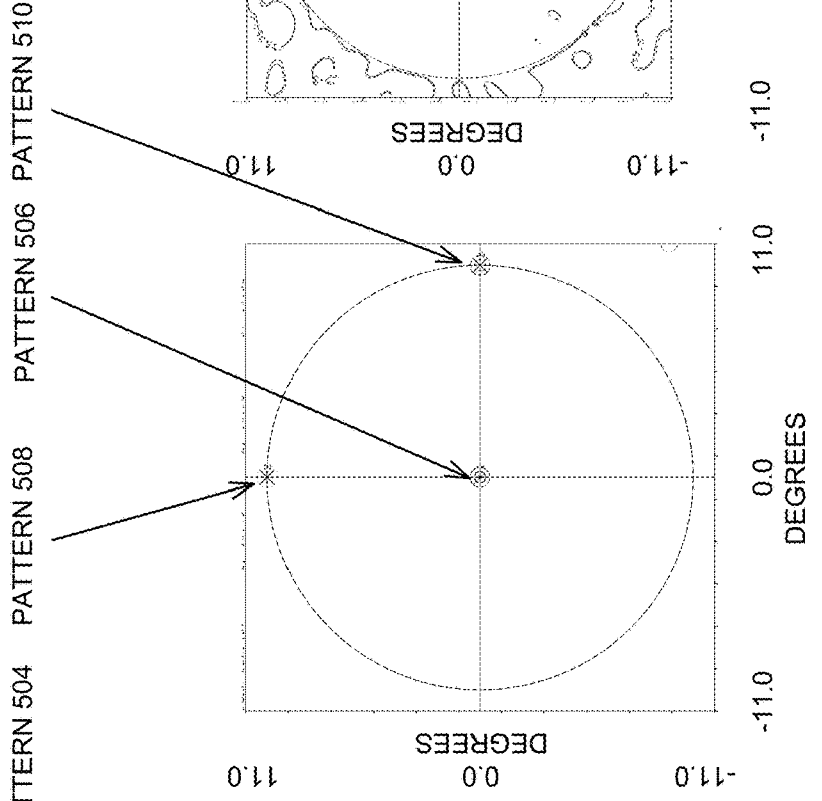
Figure 5C:
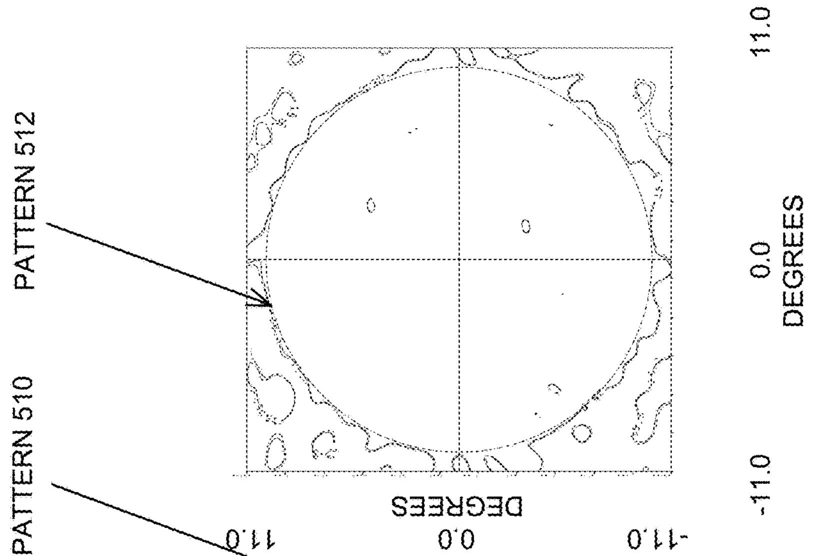

FIGS. 5A, 5B and 5C are diagrams (in degrees), illustrating the difference in beam patterns of the antenna 214 for acquisition mode vs. tracking mode.

FIG. 5A is a contour plot of a single element 300 beam used for acquisition mode. In this example, the antenna 214 in acquisition mode uses a single element 300 radiation pattern, with a wide beam at a lower gain (as compared to FIG. 5B). The three contours shown in FIG. 5A are at −2 dB down from the beam peak (500), −4 dB down from the beam peak (502), and −6 dB down from the beam peak (504). Also shown is the 20 degree diameter circle.

FIG. 5B is a contour plot of an all element 300 beam used for tracking mode. In this example, the antenna 214 in tracking mode uses a 1015 element 300 radiation pattern, with a narrow beam at a higher gain (as compared to FIGS. 5A and 5C) for a 10-degree scan angle. The three beams are: a first beam 506 scanned at 0 degrees, a second beam 508 scanned at about 9 degrees elevation, and a third beam 510 scanned at about 9 degrees azimuth. The contours are at −3 dB and −10 dB down from the beam peak.

FIG. 5C is a contour plot of an all element 300 spoiled beam used for acquisition mode. In this example, the antenna 214 in acquisition mode uses a 1015 element 300 radiation pattern, with a wide "spoiled beam" at a lower gain (as compared to FIG. 5B), with 17 dBi and 16.0 dBi contours for the spoiled beam.

Process Flowchart

Figure 6:
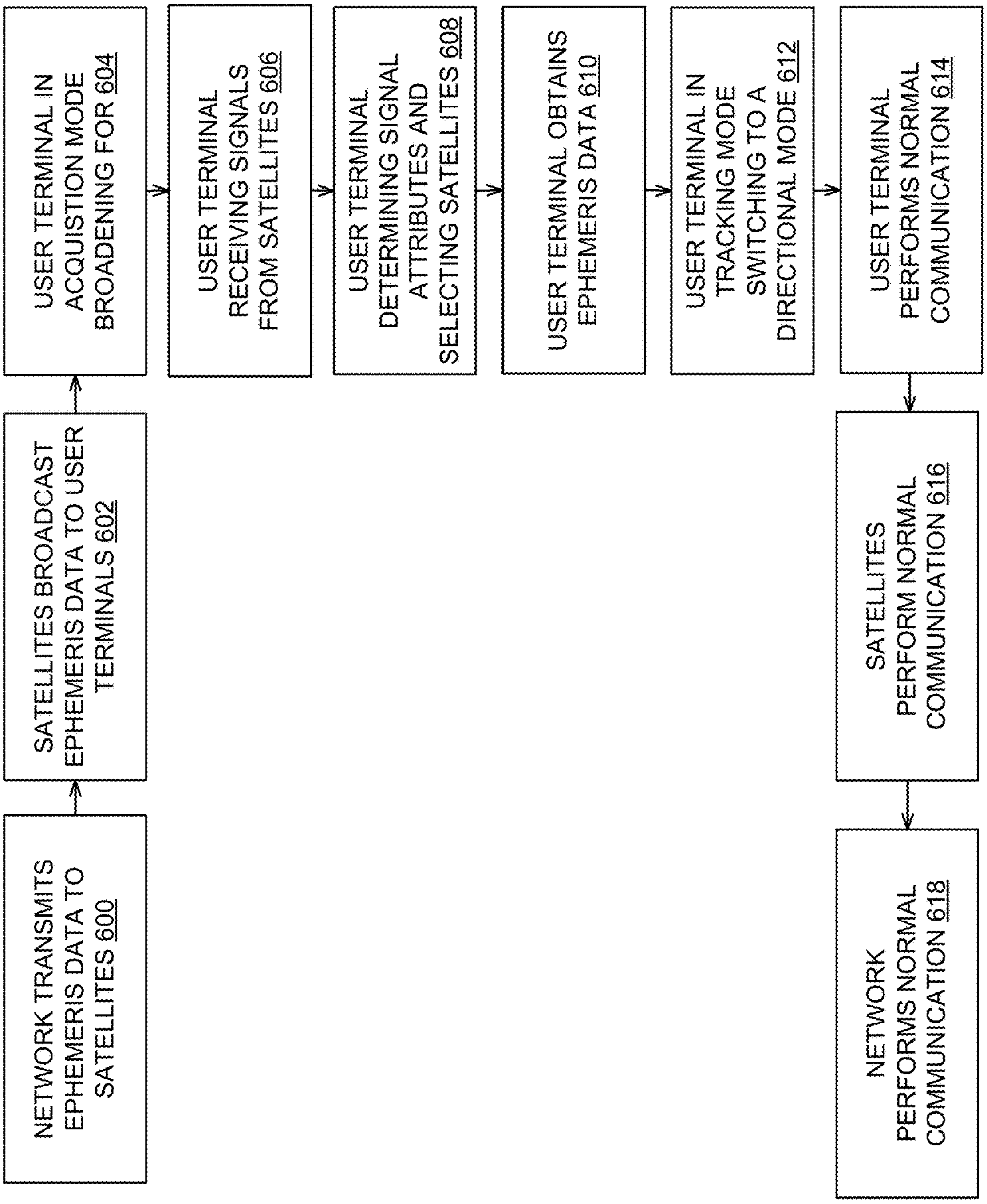
FIG. 6 is a flowchart that illustrates the steps performed by the network, satellites and user terminals, according to one embodiment.

FIG. 6 is a flowchart that illustrates the steps performed by the network 100, satellites 102 and user terminals 104 in a method of establishing communication with a satellite 102, according to one embodiment.

Block 600 represents the network 100 transmitting satellite ephemeris data to the satellites 102.

Block 602 represents the satellites 102 broadcasting the satellite ephemeris data to the user terminals 104.

Block 604 represents a user terminal 104, in acquisition mode after being turned on, broadening a field of regard of the reconfigurable phased array antenna 214 having a plurality of antenna elements 300. The broadened field of regard results in a wider beamwidth with lower gain that allows the antenna 214 to "see" as many signal sources, e.g., satellites 102, as possible.

In one embodiment, the reconfigurable phased array antenna 214 is stationary (not slewing) when the user terminal 104 is in acquisition mode. In another embodiment, the reconfigurable phased array antenna 214 is slewed to establish an initial pointing vector comprised of azimuth and elevation prior to acquisition of pilot signals from a plurality of satellites 102 within the field of regard, but the reconfigurable phased array antenna 214 is not slewed once the field of regard is selected.

In one embodiment, the user terminal 104 broadens the field of regard by using a lesser number than a total number of the plurality of antenna elements 300 of the reconfigurable phased array antenna 214. This may further comprise selecting one antenna element 300 from the plurality of antenna elements 300 of the reconfigurable phased array antenna 214 (e.g., any one of the antenna elements 300 may be selected to provide redundancy and fault tolerance), or this may further comprise selecting a sub-array of two or more antenna elements 300 from the plurality of antenna elements 300 of the reconfigurable phased array antenna 214.

In another embodiment, the user terminal 104 broadens the field of regard by using a spoiled beam by changing at least one of a phase and amplitude for (each or adjacent ones) of the plurality of antenna elements 300 of the reconfigurable phased array antenna 214 to spread a beam width. The spoiled beam is generated by introducing a phase difference that alters a coherence of the received signals at the reconfigurable phased array antenna 214.

Block 606 represents the user terminal 104 receiving pilot signals from a plurality of satellites 102 within the field of regard using the reconfigurable phased array antenna 214.

Block 608 represents the user terminal 104 determining one or more attributes of the pilot signals received from each of the satellites 102 and then selecting one of the plurality of satellites 102 for communication with the reconfigurable phased array antenna 214 based on the attributes of the received signals. In one embodiment, the one or more attributes comprise signal strength, signal quality, or proximity to other signals.

Block 610 represents the user terminal 104 obtaining the satellite ephemeris data, as well as other broadcast system information, from the selected satellite 102.

Block 612 represents the user terminal 104, in tracking mode, switching to a directional (high gain, beamforming) mode for the reconfigurable phased array antenna 214, with the elements 300 of the antenna 214 forming a narrow beam pointed at the selected satellite 102, and establishing communications with the selected satellite 102 using the reconfigurable phased array antenna 214. Thereafter, the user terminal 104 tracks the selected satellite 102 using the ephemeris data to position the beams formed by the reconfigurable phased array antenna 214, wherein an initial pointing vector comprised of an azimuth and elevation and an initial tracking vector comprised of a flight path are determined based on the ephemeris data for the satellites 102 relative to a current terrestrial or airborne location of the user terminal 104 and the reconfigurable phased array antenna 214.

Block 614 represents the user terminal 104 performing normal communications, i.e., transmitting and/or receiving, with the selected satellite 102, including applications such as consumer, commercial and military communications, satellite television, satellite radio, and Internet access.

Block 616 represents the satellites 102 transmitting and/or receiving normal communications with the user terminals 104.

Block 618 represents the network 100 transmitting and/or receiving normal communications with the satellites 102.

What is claimed is:

1. An apparatus for establishing communication with a satellite, comprising:

a user terminal including a reconfigurable phased array antenna, having a plurality of antenna elements, and a processor, wherein the processor is configured to control user terminal operations for:

broadening a field of regard, in acquisition mode after being turned on, perceivable by the reconfigurable phased array antenna at a particular time instant, by spreading a beam width using a spoiled beam, wherein the spoiled beam is based on changing a phase or an amplitude for a subset of antenna elements of the plurality of antenna elements, to introduce a phase difference that alters a coherence of received signals to spread the beam width, and to increase a receiving area for an increased signal-to-noise ratio, and wherein the reconfigurable phased array antenna is slewed to establish an initial pointing vector comprised of an azimuth and elevation prior to selecting the broadened field of regard, and the reconfigurable phased array antenna is not slewed once the broadened field of regard is selected;

receiving pilot signals from one or more satellites within the broadened field of regard using the reconfigurable phased array antenna;

selecting one of the one or more satellites based on a proximity, of the received pilot signals, to other signals, before terminating communication with a current satellite, of the one or more satellites, that has a communication established, wherein the selected one of the one or more satellites is different from the current satellite;

switching to a directional mode for the reconfigurable phased array antenna, wherein the reconfigurable phased array antenna is reconfigured to be directional towards the selected satellite by beamforming and to provide a higher gain; and establishing communication with the selected one of the one or more satellites using the reconfigurable phased array antenna in the directional mode, for completing a satellite-to-satellite handover process.

2. The apparatus of claim 1, wherein the field of regard of the reconfigurable phased array antenna is broadened using the spoiled beam by selecting a sub-array of two or more antenna elements of the reconfigurable phased array antenna to spread the beam width.

3. The apparatus of claim 1, wherein the processor is further configured to control the user terminal operations for tracking the selected one of the one or more satellites by determining an initial pointing vector comprised of an azimuth and elevation and an initial tracking vector comprised of a flight path for the selected one of the one or more satellites relative to a current terrestrial or airborne location of the user terminal based on satellite ephemeris data for the selected one of the one or more satellites.

4. The apparatus of claim 1, wherein the reconfigurable phased array antenna is stationary prior to broadening the field of regard.

5. The apparatus of claim 1, wherein the processor is further configured to control the user terminal operations for broadening the field of regard by spreading the beam width using a single antenna element of the plurality of antenna elements.

6. The apparatus of claim 1, wherein the processor is further configured to control the user terminal operations for broadening the field of regard by spreading the beam width, using the spoiled beam, with all of the antenna elements of the plurality of antenna elements.

7. The apparatus of claim 6, wherein the spoiled beam broadens the field of regard with higher antenna directivity at an edge of a beamwidth in comparison to a beam that uses a single antenna element.

8. The apparatus of claim 1, wherein the one or more satellites are selected further based on a signal strength or a signal quality of the received pilot signals.

9. The apparatus of claim 1, wherein ephemeris data broadcast by the one or more satellites is used to at least one of slew the antenna or point the reconfigurable phased array antenna at a particular satellite.

10. The apparatus of claim 1, wherein the pilot signals are received from one or more satellites within the broadened field of regard using only the subset of antenna elements, and wherein switching to the directional mode is performed after the beam being spread.

11. A method of establishing communication with a satellite, comprising:

providing a user terminal including a reconfigurable phased array antenna, having a plurality of antenna elements, and a processor, wherein the processor is configured to control the user terminal for:

in acquisition mode after being turned on, broadening a field of regard, perceivable by the reconfigurable phased array antenna at a particular time instant, by spreading a beam width using a spoiled beam, wherein the spoiled beam is based on changing a phase or an amplitude for a subset of antenna elements, of the plurality of antenna elements, to introduce a phase difference that alters a coherence of received signals to spread the beam width, and to increase a receiving area for an increased signal-to-noise ratio, and wherein the reconfigurable phased array antenna is slewed to establish an initial pointing vector comprised of an azimuth and elevation prior to selecting the broadened field of regard, and the reconfigurable phased array antenna is not slewed once the broadened field of regard is selected;

receiving pilot signals from one or more satellites within the broadened field of regard using the reconfigurable phased array antenna;

selecting one of the one or more satellites based on a proximity, of the received pilot signals, to other signals, before terminating communication with a current satellite, of the one or more satellites, that has a communication established, wherein the selected one of the one or more satellites is different from the current satellite;

switching to a directional mode for the reconfigurable phased array antenna, wherein the reconfigurable phased array antenna is reconfigured to be directional towards the selected satellite by beamforming and to provide a higher gain; and establishing communication with the selected one of the one or more satellites using the reconfigurable phased array antenna in the directional mode, for completing a satellite-to-satellite handover process.

12. The method of claim 11, wherein the field of regard of the reconfigurable phased array antenna is broadened using the spoiled beam by selecting a sub-array of two or more antenna elements of the reconfigurable phased array antenna to spread the beam width.

13. The method of claim 11, wherein the processor is further configured to control the user terminal for tracking the selected one of the one or more satellites by determining an initial pointing vector comprised of an azimuth and elevation and an initial tracking vector comprised of a flight path for the selected one of the one or more satellites relative to a current terrestrial or airborne location of the user terminal based on satellite ephemeris data for the selected one of the one or more satellites.

14. The method of claim 11, wherein the reconfigurable phased array antenna is stationary prior to broadening the field of regard.

15. The method of claim 11, wherein the processor is further configured to control the user terminal for broadening the field of regard by spreading the beam width using a single antenna element of the plurality of antenna elements.

16. The method of claim 11, wherein the pilot signals are received from one or more satellites within the broadened field of regard using only the subset of antenna elements, and wherein switching to the directional mode is performed after the beam being spread.

17. An apparatus for establishing communication with a signal source, comprising:

a reconfigurable phased array antenna, having a plurality of antenna elements; and a processor configured to cause the apparatus to:

broaden, in acquisition mode after being turned on, a field of regard, perceivable by the reconfigurable phased array antenna at a particular time instant, by spreading a beam width using a spoiled beam, wherein the spoiled beam is based on changing a phase or an amplitude for a subset of antenna elements, of the plurality of antenna elements, to introduce a phase difference that alters a coherence of received signals to spread the beam width, and to increase a receiving area for an increased signal-to-noise ratio, and wherein the reconfigurable phased array antenna is slewed to establish an initial pointing vector comprised of an azimuth and elevation prior to selecting the broadened field of regard, and the reconfigurable phased array antenna is not slewed once the broadened field of regard is selected;

receive pilot signals from one or more satellites within the broadened field of regard using the reconfigurable phased array antenna;

select one of the one or more satellites based on a proximity, of the received pilot signals, to other signals, before terminating communication with a current satellite, of the one or more satellites, that has a communication established, wherein the selected one of the one or more satellites is different from the current satellite;

switch to a directional mode for the reconfigurable phased array antenna, wherein the reconfigurable phased array antenna is reconfigured to be directional towards the selected satellite by beamforming and to provide a higher gain; and establish communication with the selected one of the one or more satellites using the reconfigurable phased array antenna in the directional mode, for completing a satellite-to-satellite handover process.

18. The apparatus of claim 17, wherein the field of regard of the reconfigurable phased array antenna is broadened using the spoiled beam by selecting a sub-array of two or more antenna elements of the reconfigurable phased array antenna to spread the beam width.

19. The apparatus of claim 17, wherein the selected one of the one or more satellites are tracked by determining an initial pointing vector comprised of an azimuth and elevation and an initial tracking vector comprised of a flight path for the selected one of the one or more satellites relative to a current terrestrial or airborne location of the apparatus based on satellite ephemeris data for the selected one of the one or more satellites.

20. The apparatus of claim 17, wherein the pilot signals are received from one or more satellites within the broadened field of regard using only the subset of antenna elements, and wherein switching to the directional mode is performed after the beam being spread.

* * * * *